United States Patent
Lim et al.

(10) Patent No.: US 11,656,148 B2
(45) Date of Patent: May 23, 2023

(54) ELASTIC MATERIAL VIBRATION TEST APPARATUS

(71) Applicants: Hyundai Motor Company, Seoul (KR); Kia Motors Corporation, Seoul (KR)

(72) Inventors: Byungguk Lim, Seoul (KR); Chang Hoon Lee, Gyeonggi-do (KR); Myung Sung Kang, Gyeonggi-do (KR); Ji Young Yeom, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/113,290

(22) Filed: Dec. 7, 2020

(65) Prior Publication Data
US 2021/0356353 A1     Nov. 18, 2021

(30) Foreign Application Priority Data
May 18, 2020    (KR) ........................ 10-2020-0058960

(51) Int. Cl.
     *G01M 7/02*      (2006.01)
     *G01M 7/06*      (2006.01)
     *G01M 7/08*      (2006.01)

(52) U.S. Cl.
     CPC .............. *G01M 7/027* (2013.01); *G01M 7/02* (2013.01); *G01M 7/025* (2013.01); *G01M 7/06* (2013.01); *G01M 7/08* (2013.01)

(58) Field of Classification Search
     CPC ......... G01M 7/027; G01M 7/025; G01M 7/06
     USPC ....................................................... 73/663
     See application file for complete search history.

(56) References Cited

U.S. PATENT DOCUMENTS

| 5,565,620 A | * | 10/1996 | Bohlin | ................... | G01N 11/16 |
| | | | | | 73/61.65 |
| 10,054,514 B2 | | 8/2018 | Brucke et al. | | |

FOREIGN PATENT DOCUMENTS

| CN | 203432801 U | * | 2/2014 |
| CN | 104914042 A | * | 9/2015 |
| CN | 106644337 A | * | 5/2017 |
| CN | 106644516 A | * | 5/2017 |
| CN | 106644750 A | * | 5/2017 |

(Continued)

OTHER PUBLICATIONS

Translate_06769036.pdf (Year: 2017).*

(Continued)

*Primary Examiner* — Alexander A Mercado
*Assistant Examiner* — Monica S Young
(74) *Attorney, Agent, or Firm* — Fox Rothschild LLP

(57) ABSTRACT

An elastic material vibration test apparatus includes a lower support plate having an upper surface on which an elastic material to be tested is placed, an upper support plate disposed above the lower support plate to be spaced apart from the lower support plate, a pillar connecting the lower support plate and the upper support plate, a pressing rod configured to pass through the upper support plate and ascend and descend in a vertical direction, an air bearing installed on the upper support plate and supporting an outer surface of the pressing rod in a non-contact state, a pressing plate coupled to a lower end of the pressing rod to press an upper surface of the elastic material, and one or more weights coupled to the pressing rod above the air bearing.

5 Claims, 4 Drawing Sheets

(56) References Cited

FOREIGN PATENT DOCUMENTS

| CN | 106769036 A | * | 5/2017 | |
|---|---|---|---|---|
| CN | 108217587 A | * | 6/2018 | |
| CN | 110208114 A | * | 9/2019 | ............ G01M 7/025 |
| CN | 113701972 A | * | 11/2021 | |
| JP | 2010261765 A | * | 11/2010 | |
| KR | 10-2007-0041194 A | | 4/2007 | |
| KR | 20070041194 A | * | 4/2007 | |
| KR | 1020070041194 A | | 4/2007 | |
| KR | 10-2010-0069865 A | | 6/2010 | |
| KR | 10-2011-0073772 A | | 6/2011 | |
| KR | 1020110073772 A | | 6/2011 | |
| KR | 101447573 B1 | * | 10/2014 | |
| KR | 10-1920860 B1 | | 11/2018 | |
| WO | WO-2009130818 A1 | * | 10/2009 | ............ G01M 7/027 |
| WO | WO-2009139089 A1 | * | 11/2009 | ............ G01M 7/027 |

OTHER PUBLICATIONS

Translated_JP2010261765.pdf (Year: 2010).*
Translate_KR20070041194.pdf (Year: 2007).*
Translation CN-110208114-A (Year: 2019).*
Translation CN-106644750—(Year: 2017).*
Translation CN-113701972-A (Year: 2021).*
Translation CN-106644516-A (Year: 2017).*
Notice of Patent Allowance for Korean Patent Application No. 10-2020-0058960, dated May 10, 2021, 3 pages, with English translation.

* cited by examiner

FIG. 4A
FIG. 4B
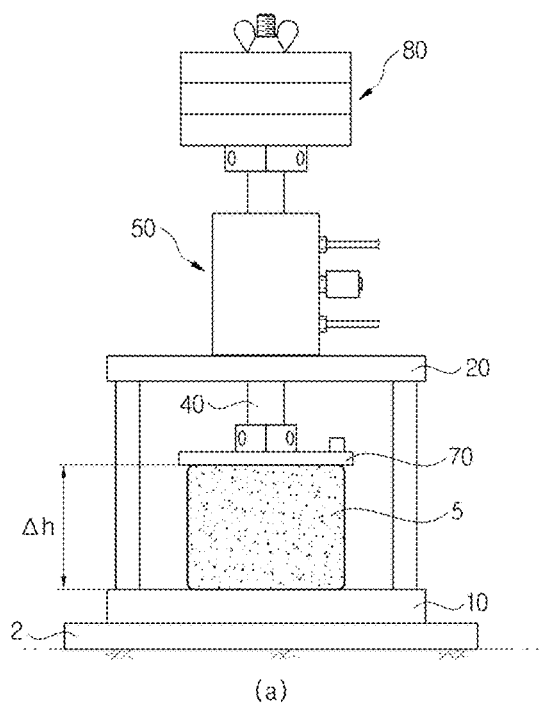
(a)
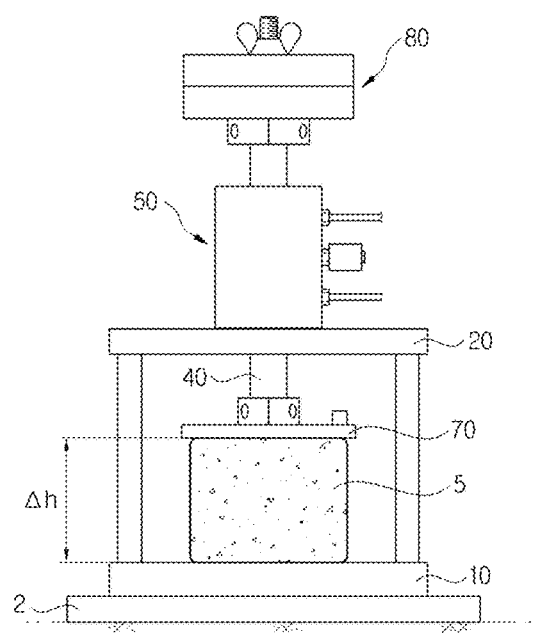
(b)

ELASTIC MATERIAL VIBRATION TEST APPARATUS

CROSS-REFERENCE TO RELATED APPLICATION(S)

This application claims under 35 U.S.C. § 119 the benefit of Korean Patent Application No. 10-2020-0058960, filed on May 18, 2020 in the Korean Intellectual Property Office, the entire contents of which are incorporated by reference herein.

BACKGROUND

1. Technical Field

The disclosure relates to an elastic material vibration test apparatus capable of testing vibration damping performance of an elastic material.

2. Description of the Related Art

Because a seat of a vehicle is in contact with the body of an occupant, various vibrations generated during operation of the vehicle are transmitted to the occupant. Therefore, seats having excellent seating and cushioning performance may provide occupants with a comfortable ride.

A porous elastic material such as a sponge is used for a seat. Seats made of elastic materials with excellent vibration damping performance and durability may provide occupants with a comfortable ride. Therefore, companies that manufacture seats or vehicles evaluate the vibration characteristics of elastic materials using various vibration test apparatuses to improve quality.

A conventional vibration test apparatus may be of a type including a weight placed directly on a seat or parts of the seat to simulate seating of an occupant, and a vibrating device for vibrating the seat or the parts of the seat.

However, a conventional vibration test apparatus is cumbersome to use because it is bulky and complex. In addition, such a vibration test apparatus has a limitation in accurately measuring vibration damping performance because friction loss occurs between parts during operation.

SUMMARY

It is an aspect of the disclosure to provide an elastic material vibration test apparatus capable of accurately measuring vibration damping performance by minimizing friction loss in a test process.

It is another aspect of the disclosure to provide an elastic material vibration test apparatus that is easy to handle by reducing a volume thereof.

Additional aspects of the disclosure will be set forth in part in the description which follows and, in part, will be obvious from the description, or may be learned by practice of the disclosure.

In accordance with an aspect of the disclosure, an elastic material vibration test apparatus includes a lower support plate having an upper surface on which an elastic material to be tested is placed, an upper support plate disposed above the lower support plate to be spaced apart from the lower support plate, a pillar connecting the lower support plate and the upper support plate, a pressing rod configured to pass through the upper support plate and ascend and descend in a vertical direction, an air bearing installed on the upper support plate and supporting an outer surface of the pressing rod in a non-contact state, a pressing plate coupled to a lower end of the pressing rod to press an upper surface of the elastic material, and one or more weights coupled to the pressing rod above the air bearing.

The elastic material vibration test apparatus may further include a weight coupling shaft installed on an upper portion of the pressing rod and having a central axis coinciding with the pressing rod, and a fastening member configured to fasten the one or more weights coupled to the weight coupling shaft.

The lower support plate, the upper support plate, the pressing plate, and the one or more weights may be provided in a disk shape and installed such that centers thereof coincide with a central axis of the pressing rod.

The upper support plate may have an outer diameter less than or equal to that of the lower support plate, the weights may have an outer diameter less than that of the upper support plate, and the pressing plate may have an outer diameter less than that of the upper support plate and an area greater than that of the upper surface of the elastic material.

The lower support plate may include an accommodating groove recessed from an upper surface thereof to accommodate a portion of a lower side of the elastic material, and the accommodating groove may have a size corresponding to the elastic material.

The elastic material vibration test apparatus may further include a first vibration sensor installed on the lower support plate, a second vibration sensor installed on the pressing plate, and a controller configured to calculate an output value for vibration damping performance of the elastic material based on detection information of the first vibration sensor and the second vibration sensor.

The elastic material vibration test apparatus may further include an air supply device configured to supply compressed air to the air bearing, and a silencer installed at an air outlet of the air bearing.

The lower support plate may include coupling holes of a same pattern as a hole pattern of a vibrating member of a vibration generator so as to be coupled to the vibrating member.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 4A and 4B illustrate an example of adjusting pressing of the elastic material by adjusting a weight of the elastic material vibration test apparatus according to an embodiment of the disclosure.

DETAILED DESCRIPTION

Figure 1:
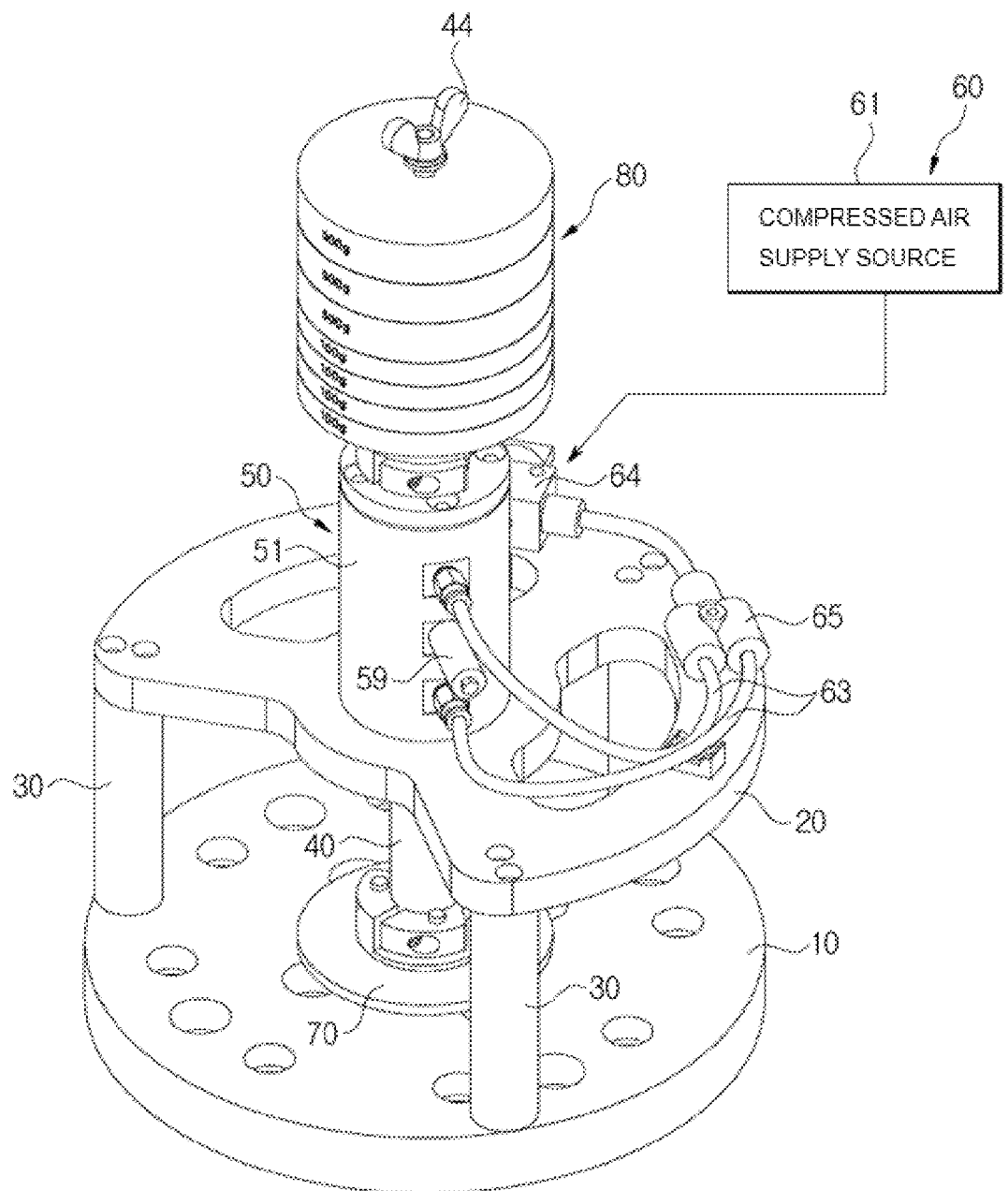
FIG. 1 is a perspective view of an elastic material vibration test apparatus according to an embodiment of the disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter embodiments of the disclosure will be described in detail with reference to the accompanying drawings. The embodiments described below are provided by way of example so that those skilled in the art will be able to fully understand the spirit of the disclosure. The disclosure is not limited to the embodiments described below, but may be embodied in other forms. In order to clearly explain the disclosure, parts not related to the description are omitted from the drawings, and the width, length, thickness, etc. of the components may be exaggerated for convenience.

Figure 2:
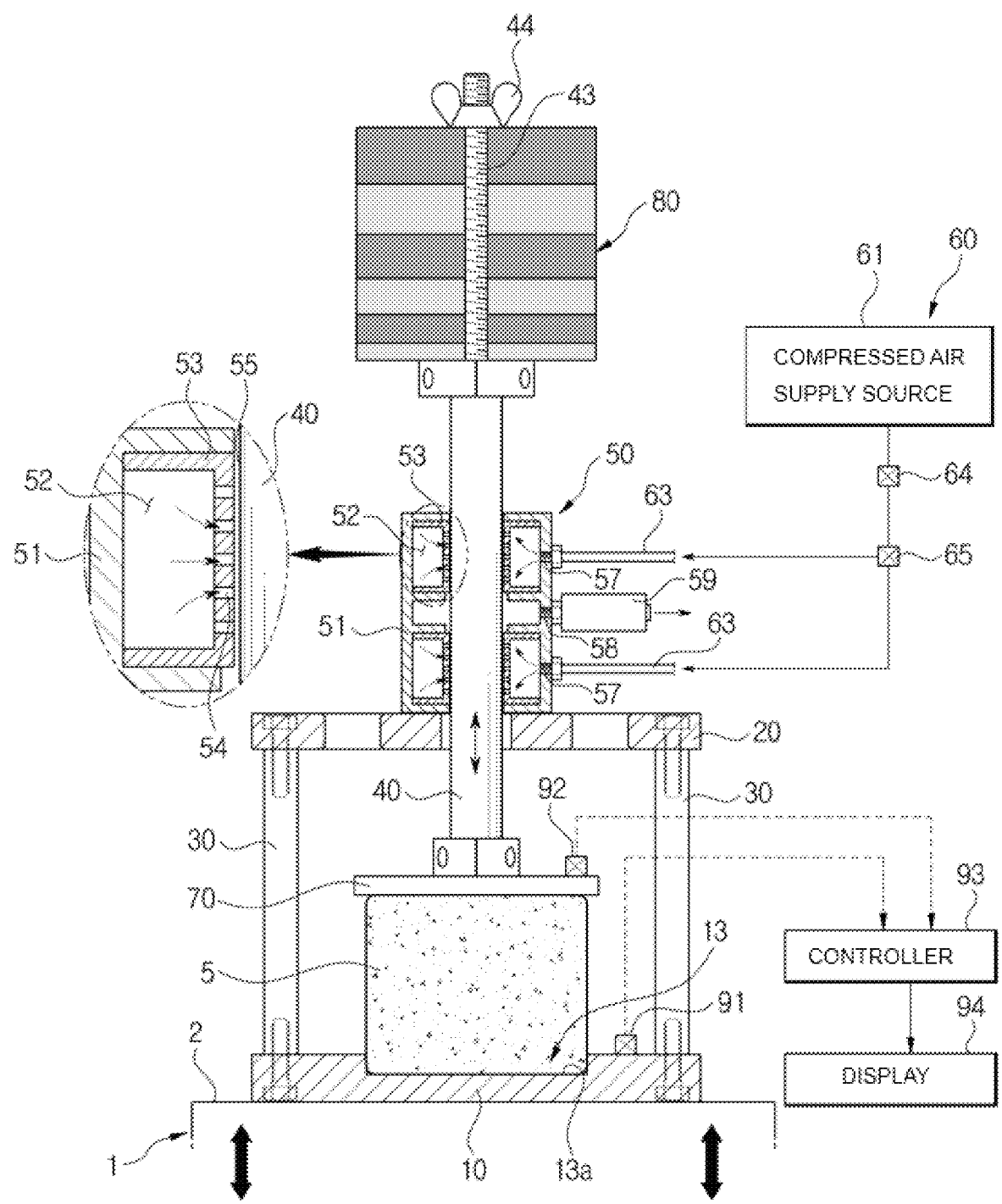
FIG. 2 is a cross-sectional view of the elastic material vibration test apparatus according to an embodiment of the disclosure.

Referring to FIGS. 1 and 2, an elastic material vibration test apparatus according to an embodiment of the disclosure includes a lower support plate 10, an upper support plate 20, at least one pillar 30, a pressing rod 40, an air bearing 50, an air supply device 60, a pressing plate 70, and at least one weight 80.

The lower support plate 10 may be made of a metal material in a disk shape. The lower support plate 10 vibrates together when a vibrating member 2 of a vibration generator 1 vibrates up and down in a state of being coupled to an upper surface of the vibrating member 2.

Although not shown in the drawings, the lower support plate 10 may be fixed to the vibrating member 2 by fastening a plurality of bolts in a state in which a lower surface of the lower support plate 10 is in close contact with the upper surface of the vibrating member 2. For this coupling, the lower support plate 10 may include coupling holes of a same pattern as a hole pattern of the vibrating member 2. The lower support plate 10 may also be coupled to the vibrating member 2 by a separate coupling device. Although this embodiment illustrates the disk-shaped lower support plate 10, the shape of the lower support plate 10 is not limited thereto and may be variously changed.

As illustrated in FIG. 2, the lower support plate 10 includes a specimen mounting portion 13 disposed in the center of the upper surface thereof so that an elastic material 5 as a test object may be placed thereon. The specimen mounting portion 13 is recessed from the upper surface to accommodate a portion of a lower side of the elastic material 5 and may include an accommodating groove 13a provided in a size and shape corresponding to the elastic material 5. As such, the specimen mounting portion 13 accommodates and supports a portion of the lower side of the elastic material 5, so that the specimen mounting portion 13 may prevent the elastic material 5 from being pushed in a lateral direction despite the vibration of the lower support plate 10 during a vibration test process.

Like the lower support plate 10, the upper support plate 20 may be made of a metal material in a disk shape. The upper support plate 20 may be disposed parallel to the lower support plate 10 in a state of being spaced apart from the top of the lower support plate 10. In addition, the upper support plate 10 is arranged such that the center thereof coincides with the center of the lower support plate 10. The upper support plate 20 may have an outer diameter equal to that of the lower support plate 10, or the outer diameter may be formed less than that of the lower support plate 10. The present embodiment illustrates the disk-shaped upper support plate 20, but the shape of the upper support plate 20 may also be variously changed.

The upper support plate 20 and the lower support plate 10 may be connected by the at least one pillar 30. FIGS. 1 and 2 illustrate an example in which the upper support plate 20 and the lower support plate 10 are connected by a plurality of the pillars 30 having the same length. The plurality of pillars 30 may be fastened to rims of the upper support plate 20 and the lower support plate 10 by fastening bolts at upper and lower ends thereof, respectively, and may be installed at an equal interval along a circumference.

The pressing rod 40 is installed to pass through the center of the upper support plate 20 and ascend and descend in a vertical direction. The pressing rod 40 may have a round bar shape, and a center line thereof may be disposed vertically with respect to an upper surface of the upper support plate 20.

The air bearing 50 is fixed to the upper surface of the upper support plate 20 and may support an outer surface of the pressing rod 40 in a non-contact state, thereby enabling the pressing rod 40 to ascend and descend relative to the upper support plate 20. As illustrated in FIG. 2, the air bearing 50 includes a cylindrical housing 51, and at least one cylindrical guide member 53 installed in the housing 51 to support the outer surface of the pressing rod 40, forming an air chamber 52 within the housing 51, and having a plurality of ventilation holes 54 formed on an inner surface thereof.

The air bearing 50 injects air toward the outer surface of the pressing rod 40 through the plurality of ventilation holes 54 when compressed air is supplied from the air supply device 60 to the air chamber 52, so that the pressing rod 40 may ascend and descend without friction with the air bearing 50. The air bearing 50 may be configured such that compressed air of substantially 0.41 to 0.55 Mpa may be supplied into the air chamber 52 and an air layer 55 of substantially 4 μm may be formed between the outer surface of the pressing rod 40 and an inner surface of the guide member 53. Accordingly, the pressing rod 40 may ascend and descend without friction while maintaining a vertical state with respect to the lower support plate 10 and a surface of the elastic material 5.

The air supply device 60 may include a plurality of air supply pipes 63 connecting a compressed air supply source 61 and an air inlet 57 of the air bearing 50, a pressure regulating valve 64 for regulating the supply of air and air pressure, and a branch member 65 for branching the plurality of air supply pipes 63.

A silencer 59 for reducing noise of exhausted air may be installed at an air outlet 58 of the air bearing 50.

The pressing plate 70 is coupled to a lower end of the pressing rod 40 to press an upper surface of the elastic material 5 placed on the lower support plate 10 downward. The pressing plate 70 may be provided in a disk shape. The pressing plate 70 may have an outer diameter less than that of the upper support plate 20 and may have an area greater than that of the upper surface of the elastic material 5.

The at least one weight 80 may be installed on an upper portion of the pressing rod 40 above the air bearing 50. The weight 80 may be provided in a disk shape having an outer diameter less than that of the upper support plate 20, and may be installed in a form in which a plurality of weights is stacked to adjust a weight thereof. In order to install the weights 80, a weight coupling shaft 43 and a fastening member 44 may be installed on the upper portion of the pressing rod 40. The weight coupling shaft 43 may be a threaded shaft installed such that a central axis thereof coincides with the pressing rod 40, and the fastening member 44 may be a nut fastened to the weight coupling shaft 43.

The vibration test apparatus of the present embodiment may be configured such that the weight 80 may be replaced with a different weight or the number of stacked weights 80 may be changed. Therefore, a force of the pressing plate 70 pressing the upper surface of the elastic material 5 may be easily adjusted.

As described above, the lower support plate 10, the upper support plate 20, the pressing plate 70, and the one or more weights 80 are provided in a disk shape and may be installed such that centers thereof coincide with a central axis of the pressing rod 40. In addition, the one or more weights 80 may have an outer diameter less than that of the upper support plate 20. Therefore, the vibration test apparatus may prevent shaking or fall during the vibration test process of the elastic material 5 and may implement a stable ascending and descending of the pressing rod 40.

As illustrated in FIG. 2, the vibration test apparatus may include a first vibration sensor 91, a second vibration sensor 92, a controller 93, and a display 94.

The first vibration sensor 91 may sense a vibration input by an operation of the vibrating member 2 in a state of being installed on the lower support plate 10. The second vibration sensor 92 may sense a vibration output after being attenuated by the elastic material 5 in a state of being installed on the pressing plate 70. The controller 93 may calculate an output value for the vibration damping performance of the elastic material 5 based on the detection information of the first vibration sensor 91 and the second vibration sensor 92 and may control to display the calculated output value through the display 94.

The controller 93 may measure the vibration damping performance of the elastic material 5 by calculating a deviation between an input vibration detected by the first vibration sensor 91 and an output vibration detected by the second vibration sensor 92 and may also record a change in vibration damping performance according to a change in vibration frequency.

Hereinafter, the operation and usage of the vibration test apparatus will be described.

Figure 3:
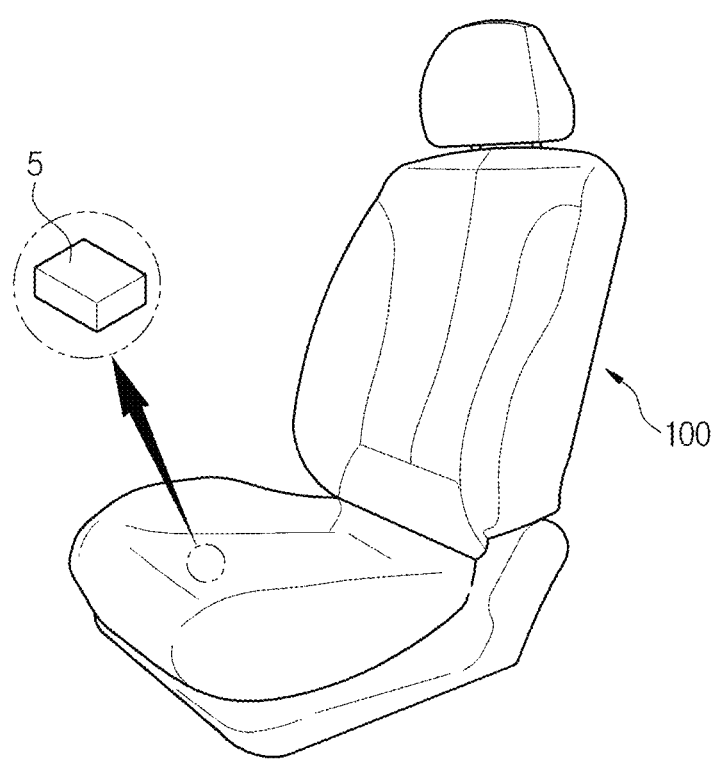
FIG. 3 illustrates an example of taking an elastic material for a vibration test from a seat of a vehicle.

For a vibration test of the elastic material 5, a standardized specimen is taken from a product to be tested. For example, as illustrated in FIG. 3, for a vibration test of a seat 100 of a vehicle, an elastic material for the test is taken from the seat 100 according to the standard. The vibration test apparatus according to the present embodiment may be miniaturized because such a small specimen (elastic material) is taken and tested.

After the elastic material 5, which is a specimen, is taken, the vibration test apparatus is placed on the vibrating member 2 of the vibration generator 1 and the elastic material 5 is placed on the specimen mounting portion 13 of the lower support plate 10, and then the upper surface of the elastic material 5 is pressed by the pressing plate 70.

Accordingly, the elastic material 5 is pressed and contracted by the weight of the weight 80, the pressing rod 40, and the pressing plate 70, so that a height of the elastic material 5 is lowered. However, as illustrated in FIGS. 4A and 4B, the vibration test apparatus of the present embodiment may adjust a pressing force in a manner of increasing or decreasing the number of the weights 80 that press the pressing rod 40 so that the height of the pressed elastic material 5 may maintain a set test height Δh. When the elastic material 5 is hard as in the example of FIG. 4A, the number of weights 80 that press the pressing rod 40 may be increased, and when the elastic material 5 is soft as in the example of FIG. 4B, the number of weights 80 that press the pressing rod 40 may be decreased.

As such, because the vibration test apparatus of the present embodiment may maintain the test height (Δh) constant through the adjustment of the weights 80, the vibration test apparatus may prevent the pressing plate 70 from colliding with the lower support plate 10 during the vibration test process and may accurately measure the vibration damping performance of the elastic material 5.

After the preparation for the test is completed, the vibration generator 1 is operated and the vibration test of the elastic material 5 is performed under the set conditions. At this time, the controller 93 may measure the vibration damping performance of the elastic material 5 by calculating a deviation between an input vibration and an output vibration based on detection information of the first vibration sensor 91 and the second vibration sensor 92. The measured information may be displayed through the display 94.

In the elastic material vibration test apparatus according to the present embodiment, because an outer surface of the pressing rod 40 is supported in a non-contact state by the air layer 55 of the air bearing 50 during the vibration test process so that the pressing rod 40 ascends and descends without friction, energy loss due to friction may be prevented. Therefore, the ascending and descending of the pressing rod 40 is smooth, so that the vibration damping performance of the elastic material 5 may be accurately measured. In addition, the pressing rod 40 ascends and descends in a non-contact state, so that abrasion of the pressing rod 40 may be prevented even when used for a long period of time.

As is apparent from the above, in an elastic material vibration test apparatus according to an embodiment of the disclosure, because an outer surface of a pressing rod is supported in a non-contact state by an air layer of an air bearing so that the pressing rod ascends and descends without friction, energy loss due to friction during a vibration test process can be prevented. Therefore, vibration damping performance of an elastic material can be accurately measured.

Further, because the elastic material vibration test apparatus according to an embodiment of the disclosure can maintain a constant test height (the height of the pressed elastic material) by adjusting the weight of a weight, a pressing plate can be prevented from colliding with a lower support plate during the vibration test process, and the vibration damping performance of the elastic material can also be accurately measured.

Further, in the elastic material vibration test apparatus according to an embodiment of the disclosure, because a small specimen is taken and tested, the vibration test apparatus can be miniaturized and has the advantage of easy handling such as transportation and storage.

What is claimed is:

1. An elastic material vibration test apparatus, comprising:
a lower support plate having an upper surface on which an elastic material to be tested is placed;
an upper support plate disposed above the lower support plate to be spaced apart from the lower support plate;
a vibration generator disposed below the lower support plate;
a pillar connecting the lower support plate and the upper support plate;
a pressing rod configured to pass through the upper support plate and ascend and descend in a vertical direction;
an air bearing installed on the upper support plate and supporting an outer surface of the pressing rod in a non-contact state;
a pressing plate coupled to a lower end of the pressing rod to press an upper surface of the elastic material;
one or more weights coupled to the pressing rod above the air bearing;
a weight coupling shaft installed on an upper portion of the pressing rod and having a central axis coinciding with the pressing rod; and
a fastening member configured to fasten the one or more weights coupled to the weight coupling shaft to maintain a constant test height which the height of the pressed elastic material by adjusting the weight of the weights;
a first vibration sensor installed on the lower support plate;
a second vibration sensor installed on the pressing plate; and
a controller configured to calculate an output value for vibration damping performance of the elastic material based on detection information of the first vibration sensor and the second vibration sensor,
wherein the lower support plate, the upper support plate, the pressing plate, and the one or more weights are provided in a disk shape and installed such that centers thereof coincide with a central axis of the pressing rod, and
wherein:
the upper support plate has an outer diameter less than or equal to that of the lower support plate,
the weights have an outer diameter less than that of the upper support plate, and
the pressing plate has an outer diameter less than that of the upper support plate and an area greater than that of the upper surface of the elastic material.

2. The elastic material vibration test apparatus according to claim 1, wherein the lower support plate comprises an accommodating groove recessed from an upper surface thereof to accommodate a portion of a lower side of the elastic material, and the accommodating groove has a size corresponding to the elastic material.

3. The elastic material vibration test apparatus according to claim 1, further comprising:
an air supply device configured to supply compressed air to the air bearing; and
a silencer installed at an air outlet of the air bearing.

4. The elastic material vibration test apparatus according to claim 1, wherein the lower support plate comprises coupling holes of a same pattern as a hole pattern of a vibrating member of a vibration generator so as to be coupled to the vibrating member.

5. The elastic material vibration test of claim 1, wherein the elastic material is a vehicle seat material.

* * * * *